United States Patent
Hery

Patent Number: 6,035,791
Date of Patent: Mar. 14, 2000

[54] PROCESS FOR THE RECYCLING OF TREATED WOOD AND THE INSTALLATION FOR THE APPLICATION OF THE PROCESS

[75] Inventor: Jean Sébastien Hery, Bordeaux, France

[73] Assignee: Beaumartin S.A., Gradignan, France

[21] Appl. No.: 08/776,232
[22] PCT Filed: May 30, 1996
[86] PCT No.: PCT/FR96/00809
 § 371 Date: Jan. 30, 1997
 § 102(e) Date: Jan. 30, 1997
[87] PCT Pub. No.: WO96/38515
 PCT Pub. Date: Dec. 5, 1996

[30] Foreign Application Priority Data

May 31, 1995 [FR] France .................. 95 06732

[51] Int. Cl.[7] .............. F23G 5/02; F23G 5/04; F23B 7/00; C10J 3/00
[52] U.S. Cl. .......... 110/230; 110/219; 110/224; 110/227; 110/233; 110/204; 110/215; 110/234; 110/342; 110/341; 48/111; 48/209
[58] Field of Search ................. 110/218, 219, 110/221, 222, 227, 229, 204, 230, 185, 186, 188, 203, 104 R, 215, 233, 234, 224, 165 R; 48/66, DIG. 1, 111, 189.5, 209; 410/341, 342

[56] References Cited

U.S. PATENT DOCUMENTS

| | | | |
|---|---|---|---|
| 3,218,998 | 11/1965 | Fairman et al. | 110/165 R |
| 3,702,039 | 11/1972 | Stookey et al. | 48/111 |
| 4,057,402 | 11/1977 | Patel et al. | 48/197 R |
| 4,279,208 | 7/1981 | Guillaume et al. | 110/346 |
| 4,306,506 | 12/1981 | Rotter | 110/229 |
| 4,459,136 | 7/1984 | Linneborn et al. | 48/111 |
| 4,732,091 | 3/1988 | Gould | 110/229 |
| 4,776,285 | 10/1988 | Wallner et al. | 110/229 |
| 4,909,162 | 3/1990 | Vollhardt | 110/234 |
| 4,926,763 | 5/1990 | Leroux et al. | 110/215 |
| 5,096,463 | 3/1992 | Beierle et al. | 48/76 |
| 5,239,936 | 8/1993 | Wichner et al. | 110/236 |
| 5,279,234 | 1/1994 | Bender et al. | 110/210 |
| 5,318,602 | 6/1994 | Juch | 48/76 |

FOREIGN PATENT DOCUMENTS

| | | |
|---|---|---|
| 0070710 | 1/1983 | European Pat. Off. . |
| 0234087 | 9/1987 | European Pat. Off. . |
| 0298951 | 1/1989 | European Pat. Off. . |
| 616625 | 2/1927 | France . |
| 4-217706 | 8/1992 | Japan ............... 110/219 |

OTHER PUBLICATIONS

Beaumartin, "Chartherm Treated Wood Recycling: A system for recycling old wooden poles and other treated wood", http://www.chartherm.com/english/chartherm/drte.html.

*Primary Examiner*—Ira S. Lazarus
*Assistant Examiner*—Ljiljana V. Ciric
*Attorney, Agent, or Firm*—Wall Marjama Bilinski & Burr

[57] ABSTRACT

Apparatus for processing and recycling CCA (copper, chrome, arsenic) treated wood chips that includes a vertical reaction chamber into which a continuous stream of wood chips is poured. Hot gases at about 400° C. are introduced into the bottom of the column to heat the chips below their ignition point. The combustion gases flow upwardly through the chips to progressively cool the gases and allow them to condense in the column. The condensate is deposited upon the surface of the chips and the gases, which are now free of heavy metals, are evacuated from the column.

18 Claims, 1 Drawing Sheet

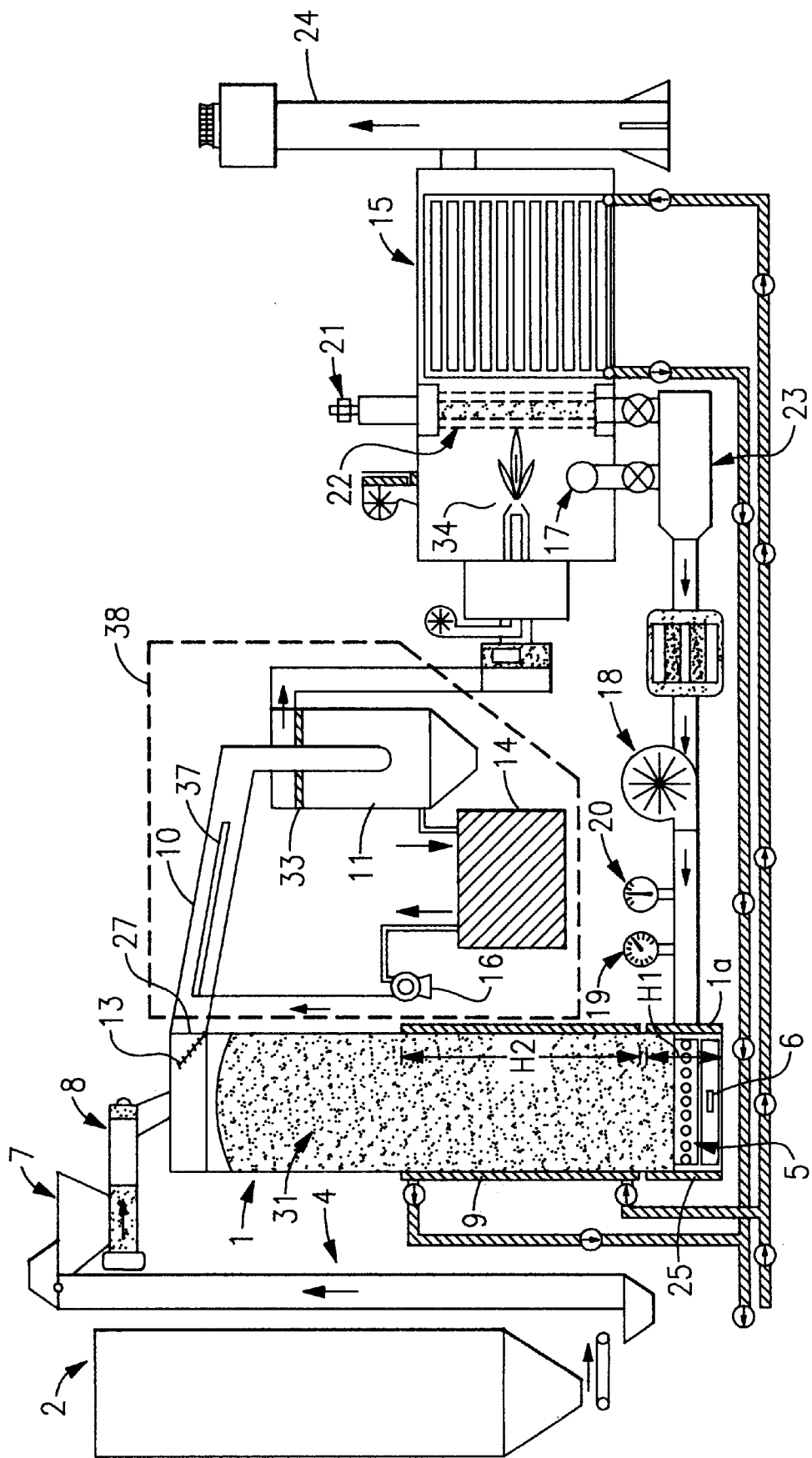

6,035,791

PROCESS FOR THE RECYCLING OF TREATED WOOD AND THE INSTALLATION FOR THE APPLICATION OF THE PROCESS

BACKGROUND OF THE INVENTION

The invention is applied in the technical sector for the recycling of treated wood and in particular those treated with CCA (copper, chrome, arsenic) which are the most difficult to recycle due to the arsenic contained in them and which are used in numerous applications, notably for power and telephone line posts as well as railway sleepers, pallets, etc.

The recycling of wood-based products is presently undertaken to a very limited degree, to comply with environmental protection requirements and regulations as well as for economic reasons.

The recycling of untreated wood poses no serious problems as the composition products for these materials may be burnt or even shredded, ground for use in the composition of other natural sub-products or for mixture with other plastic components, etc.

The recycling of treated wood is more difficult as it presents problems for which presently no solution has been found. The recycling has been made obligatory in the EC by decision of the European Council on Dec. 22, 1994 and application of Directive EC 91/689 of Dec. 12, 1991.

If we consider the application of treated wood in the manufacture of electrical or telephone posts and railway sleepers, the extent of this problem becomes clear bearing in mind how many million posts and sleepers are in use in France and abroad. These posts and sleepers have an average working life of approximately 25 years. The treatment of these posts is generally carried out using a vacuum impregnation process. In France, posts have generally been treated with CCA for the last 25 years as this treatment offers far better results, but also, and foremost, for its antiseptic qualities, cleanliness and longevity which remain unequalled today thanks to CCA's ability to fix itself to the wood which is far superior to that of all other existing wood protection products.

One of the problems encountered resides in the fact that it is practically impossible for an uninformed person to tell the difference between wood treated with metallic salts and in particular those treated with CCA and other old untreated wood, whereas wood treated with creosote or pentachlorphenol is easily recognisable due to its exterior aspect.

Furthermore, the burning of treated wood may be extremely dangerous and even more so when the wood has been treated with CCA and this not only in respect to the possible environmental pollution but also where the health of persons is concerned.

Bearing in mind the fact that treated and untreated wood from posts and sleepers is collected in an empirical and disorganised manner, one easily understands the need, in respect to public safety, for a rational structure for the gathering of old treated wood and its later elimination or recycling.

Various attempts have been made to solve the problem posed by recycling of treated wood in general and in particular that treated with CCA.

First of all it was suggested that the wood be reused but this proved of little economic interest and its commercialisation was not feasible under satisfactory economic conditions.

Another possibility was to recycle it as decorative elements in flower beds by grinding the wood and then treating it with colouring in an autoclave. This technique was not followed up due to the lack of possible outlets for the product.

The solution of dumping the wood in landfills is also not possible due to legal restrictions.

Storage may hardly be considered a solution due to the space requirements.

Burning the wood in traditional incinerators together with other waste is also not possible as the elements contained in the treated wood, in particular the arsenic in CCA, tend to combine with the other elements present in the waste to form composites which cannot be controlled. Furthermore, due to the effect of the thermal shock between ambient air and incinerator temperature, most of the arsenic contained in the wood treated with CCA evaporates and takes with it other heavy metals.

Above 450°, the arsenic trioxide particles become extremely fine and difficult to trap except using considerable means for the capture and washing of smoke. Furthermore, a more serious situation may arise in which the other elements burnt together with the wood treated with CCA may produce nascent hydrogen which when combined with the arsenic of CCA, forms arsine.

Based on the results of these experiments and taking into consideration the associated restrictions, it was decided to employ other recycling methods in order to firstly separate the wood from the treatment product. To achieve this, various separation systems such as chemical washing, microbiology and controlled combustion were studied.

The chemical washing method consists of separating the heavy metals with humidity, by first grinding the wood as fine as possible and then immersing it in a bath containing an acid solution. A filter is then used to separate the liquid from the humid dust which is then considered clean and may be processed in any combustion installation without risk of pollution. However, this technique has several inconveniences.

Regardless of the chemical mixture used, it always contains acids and the volumes required are always enormous, irrelevant of the concentration in the solution.

This technique uses a cascade system in which, after having washed the wood in an acid solution, the acid solution must be washed in water and the water must then be treated before reuse. This increases the volume to be treated and the size of the installation.

Furthermore, the cycle times are long, the installation size is considerable and the investment costs are high.

Finally, such a system is selective and may only be used with one specific type of treatment product at a time.

Microbiological separation is still at an early stage and offers no industrial application to solve the problem at hand. Studies have been carried out on different stocks of mushrooms but are presently still in the experimental stage.

Numerous studies have been carried out in respect to combustion separation in order to determine whether or not arsine is formed and how the arsenic behaves in wood treated with CCA.

If, in the first case, the authors and experts agree and consider that there is no risk of arsine formation when wood treated with CCA is burnt alone, the contrary is true in the second case. As the experimental procedures employed differ greatly, the results also differ to such an extent that in most of the countries concerned the administrative authorities have reacted in a similar manner and have taken the "wait and see" solution: temporary storage or burial of old treated wood.

Following this, most of the teams working on the combustion of treated wood solution have given up. Nonetheless, in view of current knowledge and the costs and investments necessary, only the separation by combustion method may realistically be adopted today to enable the industrialisation of the recycling of treated wood.

The incineration of wood in a special reactor at temperatures above 1,300° Celsius in order to volatilize the whole and then to recuperate all the products contained in the combustion gas using a complex installation, is a feasible but nonetheless costly solution. The risks associated with this technique and the handling of gas containing heavy metals at a high temperature are considerable. This requires the implementation of safety systems and facilities as well as numerous reliable inspection procedures with a continuous maintenance program. Furthermore, the maintaining of such a high temperature requires large quantities of energy and in all cases more energy than could be recuperated from the combustion of the wood. The considerable investment necessary for the implementation of safety systems adapted to this method require the construction of enormous installations in order to bring these costs into proportion. The need for such an enormous installation, however, makes the operation of such a system quite unrealistic.

It is therefore based on these restrictions, various work undertaken and mentioned here, that the patent applicant has undertaken to find a solution for the problem in question and in particular for posts treated with CCA, of which he is one of the major manufacturers.

SUMMARY OF THE INVENTION

The patent applicant proceeded in a new direction in respect to earlier studies and tests by undertaking to block all heavy metal vapours and in particular arsenic particles emitted during combustion in order to recuperate them in the ashes.

A further requirement was to operate at a low temperature in order to ensure a positive energy balance, calling for less complex and less expensive installations, thus lowering running costs and rendering maintenance easier.

Research was directed towards solving the problems arising from the combustion of wood treated with CCA, as this is more complex, and which must therefore meet the requirements associated with the combustion of other treated woods, with an aim to developing a system capable of burning all types of treated wood irrelevant of the treatment product.

Taking into account the physical and atomic characteristics of each of the composition elements of CCA and the observations made concerning the combustion of wood treated with CCA by the scientific teams around the world, with, in particular, the observations made regarding the volatility of arsenic, the inventive idea of the applicant was to take a different approach in relation to the studies, research and experiments undertaken previously, by studying the means and conditions which enable the control and blocking of arsenic vapour arising from the combustion of wood treated with CCA. The applicant has discovered the need to control the numerous parameters examined: operation at the lowest possible temperature, minimum air flow, rapid cooling of combustion gas and cooling of combustion ash.

Hence, the originality of the invention resides in a new recycling process by the combustion of treated wood, notable in that the treated wood is ground into wood chips and then introduced into a very tall reactor in column form, with combustion of the wood chips taking place in the lower section and cooling in the upper section, and in that, in the lower section of the reactor, the chips are subjected to adiabatic combustion provoked by hot gases with a low oxygen content and a temperature of 400° C., the volume of chips located above the combustion zone being charged with the excess heat transported with the gases and provokes a progressive cooling of these gases until a temperature under 65° C. is attained and presents an inverse temperature gradient causing condensation which, in contact with the chips, deposits the particles, in particular those of metals, tar and vapour contained in the combustion gas, and in that the non-compressible combustion gas, once free of all these heavy metals, is evacuated out of the reactor, and in that the oxygen content of the combustion gas introduced into the lower section of the reactor is kept low in order to avoid ignition of the chips and to increase the reduction effect, and in that the wood charcoal obtained from the burning of chips contains the reduction of heavy metals and other pollution elements which may then be recycled in another treatment application.

According to another characteristic of the invention, the installation for the treatment and recycling of treated wood making use of the process is notable in that it comprises a large reactor designed for introduction, from the top and by gravity, of the previously ground treated wood chips, which supply the reactor continuously, the lower section of the said reactor comprising a means for the introduction of hot gas with a low oxygen content at a temperature of 400° C. enabling, in the lower section of the reactor, the carbonisation of the chips, the said reactor being designed in the form of a column for introduction of a given volume of wood chips and enabling cooling and evacuation of the combustion gases, and in that the reactor is connected to a heat generator which monitors and controls the hot gas at a temperature of 400° C. with a facility for the distribution of hot burnt gas with a low oxygen content.

DESCRIPTION OF THE INVENTION

These characteristics and others are made clear with the following description.

BRIEF DESCRIPTION OF THE DRAWINGS

FIG. 1 is a plan view of the preferred embodiment of the present invention.

The objective of the combustion installation according to the invention is illustrated in a non-limitative way by the drawing.

The treated wood, which may, for example, come from power or telephone line posts, railway sleepers or other, are first ground to chips of a predetermined size using any appropriate machine or method. This grinding must be carried out in the direction of the wood grain rendering subsequent combustion easier as will be described further on. These chips (31), which come from wood impregnated with an antiseptic product during treatment, are transferred using any suitable means of conveyance, to the reception tank (2). The chips are then transferred from the tank to the reactor (1) using a means of conveyance (4). The aforementioned reactor has the form of a very tall column of which the lower section contains an adiabatic combustion chamber and the upper section comprises a system for the supply and uniform dispersion of the chips.

More precisely, in the lower section of the reactor, a specific zone is intended for the combustion of the chips which are advantageously placed on an oscillating grid (5) and enables evacuation of the combustion products in the form of charcoal in a removable ashtray (6). The temperature in the lower reactor zone is approximately 400° C. This temperature was specifically selected in order to remain under the sublimation temperature of arsenic and above the ignition-point of wood treated with CCA (392° C.). All wood chips located above the combustion zone form a cooling column, thus ensuring that the exhaust gas temperature remains under 65° C.

According to an advantageous design element of the invention, the chips may be humidified during their transfer to the outlet of the collector tank (2) via a hopper (7) in a wood-chip prehumidification chamber (8), before being introduced into the reactor.

The said chips are piled up in the reactor and, as the chips are gradually burnt in the lower section and due to the oscillations of the grid, penetrate into the core of the reactor by force of gravity, the latter being filled according to a continuous operation cycle.

In this way, the process for the recycling of treated wood according to the invention is aimed at ensuring the adiabatic combustion of treated wood introduced into a reactor in the form of chips and ensuring rapid cooling of the combustion gas. This combustion is ensured by controlling the temperature in the lower section of the reactor at approximately 400° C. with a supply of hot air low in oxygen content in order to avoid ignition of the chips. The volume of chips located above the combustion zone is charged with the excess heat transported by the gas given off by the combustion process and ensures progressive cooling of this gas and in the upper section of the reactor column presents an inverse temperature gradient. The latter, in turn, provokes the condensation which, in contact with the chips, decreasingly deposits on them all particles, in particular, metals, tars and vapours contained in the combustion gas. The result of this combustion process is the obtaining of a combustible gas at the exhaust outlet in the upper section of the column and in the lower section a wood charcoal in which all heavy metals and other dangerous elements contained in the antiseptic product with which the wood was impregnated during treatment are trapped. For example, in the case of wood treated with CCA, the wood charcoal contains all copper, chrome and arsenic present in the wood after impregnation.

In the upper section of the reactor, the temperature of the exhaust gas after having passed through the wood chips is inversely proportional to the height of the column. Furthermore and in the advantageous hypothesis that the chips are prehumidified, it is noted that the greater the degree of humidification in the upper section of the column, the greater the inverse gradient will be and consequently, the lower the column may be for the same exhaust temperature.

Therefore, the height of the wood chips in the reactor and the degree of humidification of these wood chips are calculated to be sufficient to ensure that the exhaust gas temperature drops below a level of 65° C. This combustion gas may therefore be considered clean as all dangerous elements including arsenic are trapped in the wood chips by the combined effect of the inverse thermal gradient, the filtering function of the chip column in the reactor and the temperature far below the condensation point of each of the polluting elements. It is also obtained and noted by the process that the lower the exhaust gas temperature is in the upper section of the reactor, the richer the composition of the wood charcoal taken from the lower section of the reactor will be.

The process according to the invention, which applies an essential parameter in the control and monitoring of the cooling of the combustion gas, is further improved if the cooling of the wood chips is accelerated by placing an additional cooling jacket comprising a water circuit around the reactor at a height above the level of the combustion chamber. The thermal yield of the system is thus improved. To ensure the reliability of the process over a longer period of time, when run continuously, the wood charcoal obtained must be extracted regularly and preferably as it is obtained, in accordance with the other parameters, in particular, the proportional supply of wood chips into the reactor, whether prehumidified or not. Control of this humidification is essential for regular and controlled operation. Variations in the degree of humidification may be corrected when necessary by modifying the water flow rate in the cooling jacket around the reactor.

Furthermore, the process also aims to provide an additional safety phase for the control of exhaust gases leaving the reactor. One or more additional washing stages and one gas purification stage are performed advantageously in a system for distributing and recycling water in a closed circuit. This advantageous process guarantees additional safety insofar as the facility enables blocking and recuperation, in case of an accident, of the vapours which may escape from the reactor.

Readings and sampling of gas washing water enables monitoring and detection of the presence or absence of heavy metals or other chronical particles such as chlorine or arsenic.

Detection of the presence of such elements enables the immediate implementation of the imposing corrective actions.

It can be seen from the above that the process for the recycling of treated wood is particularly interesting, especially for wood treated with CCA. The wood charcoal laden with heavy metals may be recycled in total security in other known specific applications.

It now remains to describe the principal components of an installation designed for use with the process in this invention, in reference to the associated drawing.

The principal components of the installation for the application of the process comprise a means for the supply of wood chips to the reactor for continuous combustion. The reactor enables the carbonisation of these wood chips under the aforementioned combustion temperature and exhaust gas conditions. The reactor (1) is closely linked to the heat source generator (34) for control and regulation of the pre-set temperature of 400° C. with distribution of hot gas low in oxygen content in order to ensure control and monitoring of the pollution gases and matter as well as combustion of the wood chips.

In addition, the installation incorporates a means of ventilation (18) and supply of hot gases through the said reactor, a means for controlling and monitoring (19, 20) the various parameters (temperature, pressure, flow-rate, oxygen content), a means for extracting gas (21), (22), (23) coming from the reactor and a means for mixing fresh air with the burnt gas.

Furthermore, the said installation comprises additional safety and monitoring systems for the inspection and detection of the presence or absence of certain heavy metals on the outlet side of the reactor, this means also comprises a gas purification system.

The following is a detailed description of an installation for implementation of the process.

The installation comprises a reactor (1) composed of a steel column with a diameter proportional to the hourly quantity of chips to be carbonised. This column comprises, from bottom to top:

- a sealed ashtray (6) equipped with an ash evacuation system,
- a hot gas inlet (1a) in the lower section of the reactor, said section being heat insulated over an appropriate height (h1) of the reactor,
- an oscillating grid (5) enabling evacuation of the carbonised products and organisation, by means of vibration, of the down-flow of the wood chips. The grid is moved using any known drive facility,
- a combustion zone in which the inner walls are lined with a refractory material (25) of a height (h1) above the oscillating grid. This height may be approximately 25 centimeters for example,
- a reactor cooling zone located above the aforementioned combustion zone. This cooling zone is advantageously approximately 2.5 times the diameter of the reactor and forms the reactor column. An additional water cooling jacket (9) is placed around this zone and for part of its height in an advantageous proportion of two thirds, thus fulfilling the double function as cooling element and heat exchanger,
- a sealed wood chip supply inlet located in the upper section of the reactor,
- at the same level as the latter, a combustion gas outlet (27) and humidifying chamber (10) protected with a grid (13), designed to prevent updraft of the chips.

As a possible additional element, the reactor may be equipped with a facility (shown) for the uniform radial dispersion of the wood chips. This facility is located in the upper section of the reactor. Details relating to the above mentioned grid and facility are each commonly known to those of ordinary skill in the field and therefore do not form an essential part of the present invention.

Furthermore, the installation comprises a heat generator designed to provide a hot gas at a temperature of 400° C. with a low oxygen content in order to avoid the ignition of the wood in the reactor and to favor the reduction of polluting elements, a facility for controlling the hot gas volume which must be proportional to the hourly quantity of chips to be carbonised.

The installation comprises a centrifugal ventilation fan placed between the heat generator and the lower section of the reactor and is designed to deliver the hot gas at a temperature of 400° C. to the combustion zone. The capacity of the fan (18) enables the said gas to pass through the column of wood chips in the reactor while, at the same time, extracting the burnt gas from the heat generator.

In order to ensure the distribution of hot air with a low oxygen content, the installation comprises an additional mixing box (23) which is used to mix fresh air taken from outside the installation with burnt gas extracted from the heat generator, in order to regulate the exhaust temperature from the mixing box and the oxygen content.

In addition, a wood chip supply system is incorporated and is sealed in respect to the external environment and supplies the chips to the upper section of the reactor. The said wood chips taken from a storage silo (2) may advantageously pass through a humidifier (8) located above the upper section of the reactor in order to ensure continuous supply of wood chips with a predetermined level of humidity.

Furthermore, the installation comprises a safety system (38) designed to control, by means of gas purification, the content of particles in the exhaust gas leaving the reactor. This purification system is composed of one or several water spray curtain (37) washing stages with recycling of water in a closed circuit, purification collector (11) and disseccation filter (33), and a water buffer tank 14 and a water pump (16). This system is above all a safety element enabling the blocking and recuperation, in case of an accident, of vapours which may escape from the reactor. It may also be used to monitor, by means of regular sampling of the washing water, the quantity of critical elements such as copper, chrome, arsenic, chlorine, etc.

In an advantageous form, the exhaust side of the gas purification system may be provided with a gas extractor fan 18, the purpose of which is to control the flow-rate and pressure of the combustion gas extracted from the reactor and passing through the purification system.

The installation comprises, on the exhaust side of the extractor fan, a boiler with low-oxygen gas burner designed to burn the gas at a temperature greater than 1,100° C. and to maintain this temperature for a period of at least two seconds. They are then evacuated via a chimney 24 in compliance with valid standards.

In an advantageous form, the installation may be designed in a closed circuit enabling extraction of part of the burnt gas through the boiler which is then recycled in the reactor at a temperature of 400° C. after mixing with fresh air taken from outside the installation and control of the oxygen content.

More precisely, the gas combustion boiler (15) is linked to the lower section of the reactor to enable transfer, via a hot gas feed-through (17), of a part of the latter to the reactor by means of the heating ventilator fan (18), and this at a temperature of 400° C. Temperature (19) and oxygen (20) monitoring sensors are installed in the gas circuit to the reactor in order to ensure that the required characteristics are attained. The purpose of the oxygen monitoring sensor is to check the oxygen content in the gas transferred to the reactor. This content must be low to ensure carbonisation of the chips by avoiding the appearance of combustion flames and favour the reduction of all non-volatile components.

A fresh air inlet (21) passes through the boiler (15) via a re-heater (22) and is then mixed with the recycled hot gases in the mixing block (23) in order to regulate the temperature and quantity of oxygen in the hot gases.

In this way, operation of the installation and carbonisation of treated wood, in particular wood treated with CCA, is carried out according to a specific process in which wood chip combustion takes place at a very low temperature below the sublimation temperature of arsenic and above the ignition-point of wood, set at 400° C., with rapid cooling of the combustion gas obtained, on the one hand, by providing a supply of humidified wood chips and, on the other hand, by controlling reactor cooling. The temperature of the combustion gas on the exhaust side of the reactor is below 65° C.

The carbonised chips trap the molecules of the impregnation products and in particular arsenic. This charcoal may then be recycled for another known application.

All heavy metals which have been reduced and are trapped in the wood charcoal, are no longer soluble or dangerous for the environment or for persons working with or handling them.

The process according to the invention, when applied in an installation as described as a non-limitative example, is therefore designed to control the combustion of treated wood by avoiding the volatilisation of heavy metals and other harmful elements such as chlorine or arsenic by controlling the combustion temperature which is kept at a level below the sublimation temperature of arsenic. Furthermore, the process is designed, in its entire cycle, to reduce the temperature of the combustion gas thus ensuring that operation of the installation is safer, less complex and hence with lower running costs.

The originality of the invention, which consists in humidifying the wood chips, enables reduction of the temperature with continuous cooling of the gas. The condensates remain on the wood which, after adiabatic combustion, becomes charcoal. Hence, the transformation chain is totally controlled and volatilisation of the harmful elements is avoided. The outside environment is therefore perfectly protected. The process according to the invention and the installation for application of this process ensure continuous control at all times of the process and guarantee the non-evaporation of the arsenic or chlorine by enabling immediate adjustment, when necessary, of the combustion system. The invention is therefore particularly advantageous and offers a very satisfactory solution to the problems outlined above relating to the processing of old treated wood in general, and in particular wood treated with CCA, which have arrived at the end of their service life.

I claim:

1. A method for the recycling of treated wood that includes the steps of:

grinding treated wood into wood chips;

introducing said wood chips into an upper section of a vertically disposed reactor column in order to fill said reactor column, subjecting the chips in a lower section of the reactor column to hot gases having a low oxygen content in order to adiabatically heat the wood chips below the ignition point of the wood chips, moving the hot gases upward through said wood chips in the upper section of the reactor column to progressively cool the gases to a temperature below the condensation temperature of the gases and deposit condensed particulates in the form of heavy metals on said wood chips, evacuating gases free of heavy metals out of the reactor column, and recovering wood charcoal from the reactor column.

2. The method of claim 1, including the step of humidifying the wood chips prior to the introducing step.

3. The method of claim 1, including the steps of evacuating cooled gases from the reactor column through one or more humidification chambers and monitoring the evacuated gases for the presence of harmful particles.

4. The method of claim 1, including the step of varying the amount of humidification of the wood chips in the reactor column to control the cooling of the gases as the gases pass through the upper section of the reactor column.

5. The method of claim 4, including the step of mounting a cooling jacket around the reactor column.

6. The method of claim 1, including the step of sensing the hot gas temperature and the oxygen content in the hot gas on an intake side of said reactor column.

7. The method of claim 1 wherein said wood chips are formed from wood treated with copper, chrome and arsenic (CCA).

8. The method of claim 7, including the step of maintaining the gas temperature in the lower section of the column at about 400° C. and the cooled gas at the uppermost section of the column at about 65° C.

9. Apparatus for processing and recycling treated wood chips that includes:

a vertically disposed reactor column, means for continuously introducing wood chips into the top of said reactor column to fill said reactor column, a heat generator connected to the lower section of the reactor column for introducing a hot gas into the lower section of the column through a gas inlet, wherein the hot gas is introduced at about 400° C. into the reactor column, the introduced hot gas having a low oxygen content to provocate adiabatic combustion which produces carbonization of said wood chips, wherein the hot gas cools as the hot gas rises through the reactor column; and a prehumidification chamber located above the upper section of the column for treating chips as they are introduced into the column.

10. The apparatus of claim 9, including ventilation means for drawing the hot gas through the reactor column, monitoring means for determining various gas parameters of said hot gas prior to introducing said hot gas into the reactor column, and mixing means for adding ambient air to the hot gas before said hot gas is introduced into the reactor column.

11. The apparatus of claim 9, including a gas purification system for detecting and controlling a quantity of polluting elements in the cooled gas.

12. The apparatus of claim 9, wherein said reactor column includes a sealed ashtray in a lower portion of the column, a hot gas inlet mounted over said ashtray, a vibratory bed in relation to said ashtray for evacuating carbonized products from the column, a combustion zone disposed above said ashtray in the column which is lined with refractory material, a cooling zone in the column disposed above the combustion zone, a sealed wood chip supply inlet mounted in the top of the reactor column for introducing chips into the cooling zone, and a combustion gas exhaust in the top of the column having a protective grid.

13. The apparatus of claim 12 that further includes a water jacket surrounding the cooling zone of the column.

14. The apparatus of claim 9, that further includes a centrifugal ventilation fan placed between the heat generator and the lower section of the reactor column for delivering hot gas at about 400° C. into the combustion zone in the lower section of the column.

15. The apparatus of claim 14, including a mixing box for combining ambient air with gases from the heat generator.

16. The apparatus of claim 9, that further includes gas purification means for controlling particulate materials in the cooled gas, said gas purification means further including at least one gas washing stage for recycling wash water from said at least one stage in a closed circuit.

17. The apparatus of claim 16, that further includes a gas extractor from on an outlet side of the gas purification system for controlling the flow rate and pressure of gas extracted from the reactor column.

18. The apparatus of claim 9, wherein said heat generator includes a boiler for burning low-oxygen content gas taken from the reactor maintaining the gas at a temperature of about 1,100° C. for a period of at least two seconds, means for evacuating said gas from said heat generator after said burning and tapping means for recycling a quantity of the burnt gas for distribution in the reactor column at a temperature of about 400° C.

* * * * *